United States Patent [19]

Hoffman et al.

[11] 4,414,473

[45] Nov. 8, 1983

[54] RESILIENT MOUNT FOR MODULAR DETECTOR CELL

[75] Inventors: David M. Hoffman; Dennis Pritzkow; George R. Lang, all of New Berlin, Wis.

[73] Assignee: General Electric Company, Milwaukee, Wis.

[21] Appl. No.: 236,804

[22] Filed: Feb. 23, 1981

[51] Int. Cl.³ .................................................. G01T 1/20

[52] U.S. Cl. ........................................ 250/366; 378/19

[58] Field of Search ............... 250/366, 367, 385, 370, 250/485.1, 363 S, 368, 361 R; 378/19, 161

[56] References Cited

U.S. PATENT DOCUMENTS

| | | | |
|---|---|---|---|
| 4,031,396 | 6/1977 | Whetten et al. | 250/385 |
| 4,095,109 | 6/1978 | Aichinger et al. | 250/374 |
| 4,119,853 | 10/1978 | Shelley et al. | 250/385 |
| 4,157,474 | 6/1979 | Koontz et al. | 378/161 |
| 4,161,655 | 7/1979 | Cotic et al. | 250/385 |
| 4,181,856 | 1/1980 | Bone | 250/366 |
| 4,187,427 | 2/1980 | Cusano | 250/366 |
| 4,260,891 | 4/1981 | Williams | 378/19 |
| 4,276,476 | 6/1981 | Cotic | 250/385 |
| 4,336,458 | 6/1982 | Krumme et al. | 250/367 |
| 4,338,521 | 7/1982 | Shaw et al. | 250/366 |

*Primary Examiner*—Alfred E. Smith
*Assistant Examiner*—Carolyn E. Fields
*Attorney, Agent, or Firm*—Leydig, Voit, Osann, Mayer & Holt, Ltd.

[57] ABSTRACT

A resilient locking and sealing arrangement for a multi-channel reflective cavity scintillation detector useful in a CT scanner. The absorption coefficient of the detector window is minimized in order to enhance detector efficiency, by forming such window of layers of woven graphite fiber bonded together with epoxy. The detector window includes resilient sealing means positioned to engage the leading edge of unit cell elements assembled to form a detector array. Resilient lock means force the plate into a reference position and into contact with the resilient sealing means thereby to accurately locate the plate in the array, and also to provide an effective light seal.

6 Claims, 5 Drawing Figures

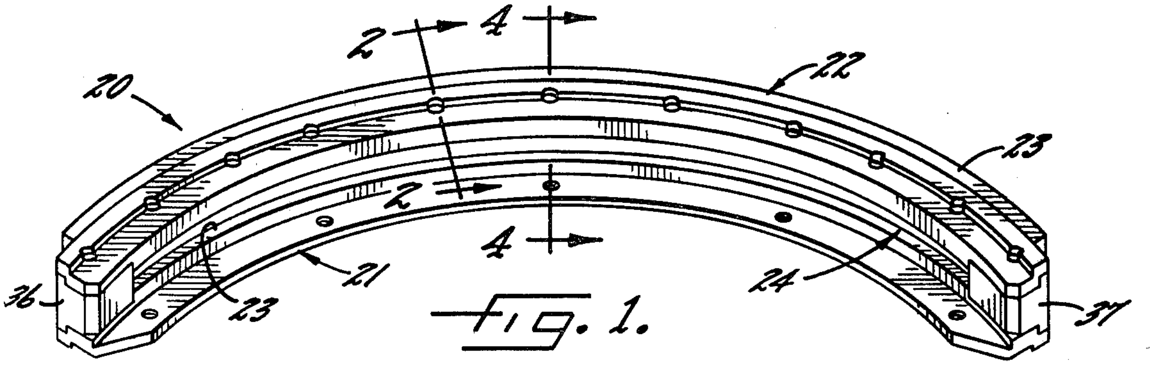
Fig. 1.
Fig. 2.
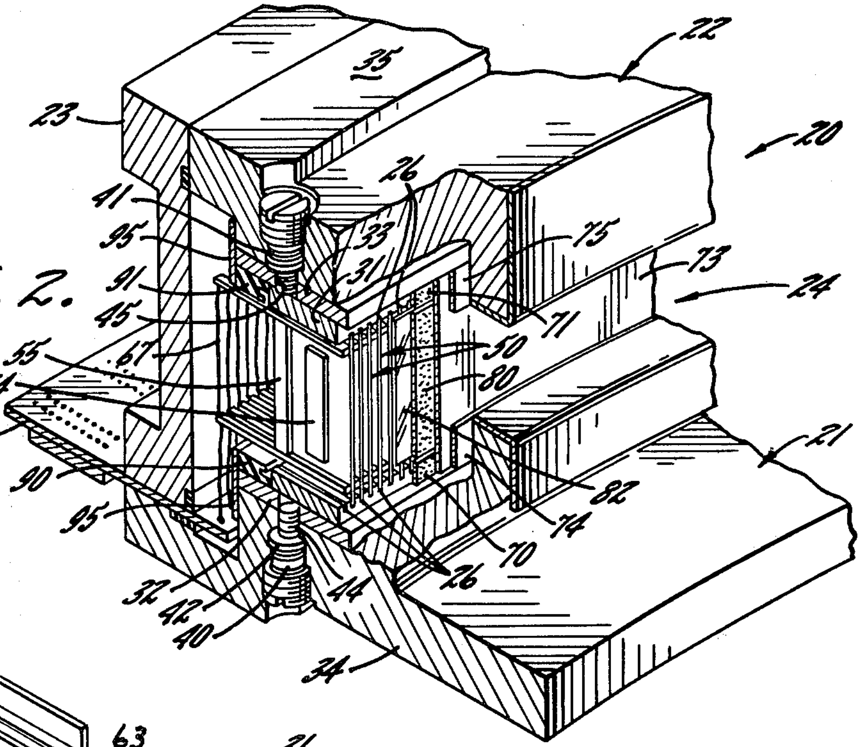
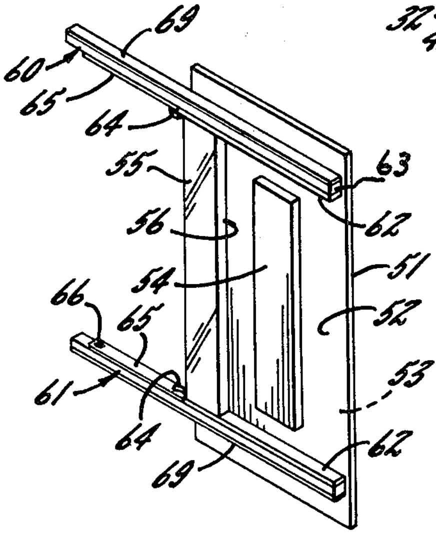
Fig. 3.
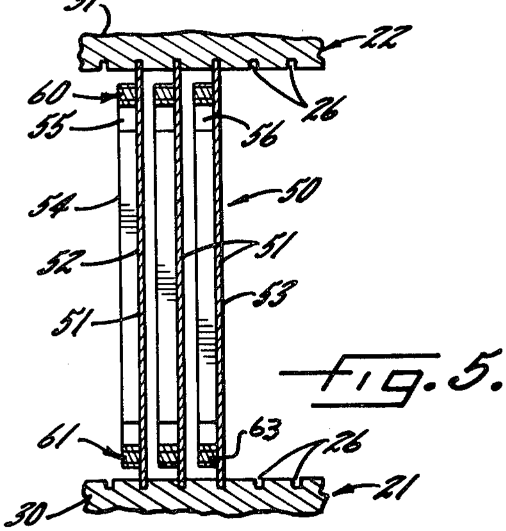
Fig. 5.

RESILIENT MOUNT FOR MODULAR DETECTOR CELL

This invention relates to X-ray detectors (apparatus for converting incident X-ray photons into a measurable electrical signal) and more particularly to the class of X-ray detectors which have come to be known as "solid state".

Detectors of this sort have an important use in CT scanners. In contrast to the early primitive scanners using only one or a very small number (about 30) detectors, modern scanners incorporate hundreds of detector cells, attempt to pack them as tightly as practical to increase spatial resolution, and make them as efficient as practical in order to increase contrast resolution.

A successful CT detector is described in the following U.S. patents: Whetten et al U.S. Pat. No. 4,031,396; Shelley et al U.S. Pat. No. 4,119,853; and Cotic et al U.S. Pat. No. 4,161,655. That type of detector uses xenon gas under high pressure and operates on the principal of detecting X-rays by their proportional ionization of the xenon gas. The ionization charge in the xenon gas is collected in an electric field established by spaced parallel tungsten plates and the charge collected is proportional to the number of X-rays absorbed in the gas.

While high pressure xenon detectors of that type have met with considerable success, certain improvements would be of even further benefit to the CT art. Initally, the detector relies on fields established by relatively high potentials (on the order of 500 volts) on closely spaced plates (one or two millimeters) which creates the possibility of microphonic problems. More particularly, movement in any of the field establishing elements alters the field, creating a spurious signal. Avoiding microphonics requires a rigid construction and vibration isolation, which can be achieved but at the cost of permanently bonding the field establishing plates in position.

It is known that optimum operation of modern CT scanners require good cell to cell linearity, meaning each detector cell desirably has characteristics closely matched to its neighbors. Careful screening procedures for detector components and care in the assembly operation can provide some control over linearity. However, since the detector cannot operate as a detector until it is assembled, pressure sealed, evacuated then charged with gas, uniformity cannot be finally determined until complete assembly. An out of specification condition requires substantial disassembly and rework, complicated by the fact that the plates are now bonded firmly in their respective positions.

Finally, the pressure within the xenon detectors is typically on the order of 25 atmospheres, which indicates that the chamber itself must be capable of withstanding substantial internal pressure. As a result, the detector window, which is intended to be as X-ray permeable as possible, is made of a machined aluminum section of not insubstantial dimension (0.133 inches) which absorbs sufficient X-radiation to measurably reduce the detection efficiency of the detector.

While the aforementioned problems are not insurmountable in producing a practical xenon detector, adoption of a solid state approach can avoid many of the consequences.

Among the solid state detectors proposed heretofore is the reflective cavity cell shown in Cusano U.S. Pat. No. 4,187,427. The interior of each cell is rendered highly reflective in order to minimize optical losses in transmission of light from the scintillating crystal to the photodetector diodes positioned at the ends of the cell. The various embodiments disclosed in the patent suggest an assembly procedure where the reflective cells with scintillator are first assembled, then the photosensitive diodes associated with the cells at some later stage of the assembly operation. That approach requires attention to fairly tight tolerances during the assembly operation and any subsequent cell interchange operation. Finally, the relatively rigid structures suggested in Cusano can be susceptible to cross talk, that is leakage of light produced by the scintillator in one cell to the photodiode in another.

In view of the foregoing, it is a general aim of the present invention to provide an improved multichannel solid state detector which attains close cell element position tolerances while at the same time simplifying the assembly operation.

Accordingly, it is an object of the present invention to minimize the critical tolerances which need to be given attention during final assembly of detector cells into a solid state detector array. A corollary object is to provide a light seal for such a detector which minimizes cross talk.

According to a further aspect of the invention, it is an object to increase detector efficiency by minimizing the absorptivity of the detector window.

An additional object is to provide a solid state detector mounting arrangement which minimizes the effects of thermal stresses.

Other objects and advantages will become apparent from the following detailed description when taken in conjunction with the drawings in which:

FIG. 1 is a perspective view showing a detector assembly exemplifying the present invention;

FIG. 2 is a partial sectional perspective taken along the line 2—2 of FIG. 1;

FIG. 3 is a perspective view showing a single element unitary cell;

FIG. 5 is a view taken along the line 5—5 of FIG. 4 showing a plurality of unitary cells in a detector assembly.

Figure 4:
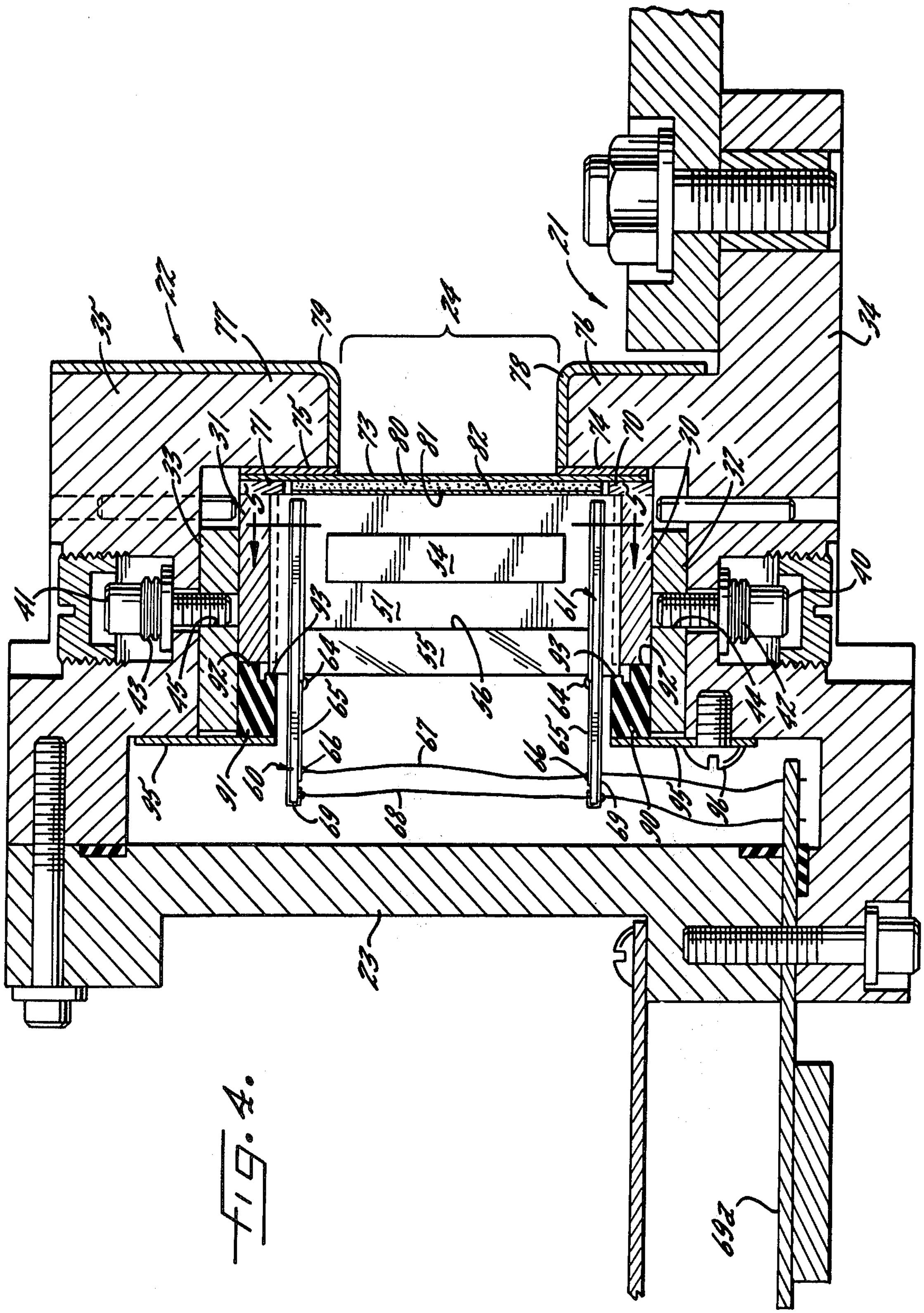
FIG. 4 is a sectional view taken along line 4—4 of FIG. 1 showing a unitary cell and its improved locking arrangement.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Turning now to the drawings, FIG. 1 shows a detector assembly of the type particularly suited for use in a rotate-rotate CT scanner. The detector has a housing 20 which is arcuate in shape, and which includes a pair of end members 21, 22, a rear wall 23 and a front window 24 enclosing a volume containing a plurality of detector cells. When disposed in a CT scanner, the detector array is mounted opposite an X-ray source, with the focal spot of the source being located at the center of the detector arc. The X-ray source and detector are fixed with respect to each other so that a fan beam swath of radiation produced by the source falls on the detector window 24, to produce a plurality of electrical signals, one from each cell within the detector assembly. The source-detector assembly is rotated about a patient aperture to produce a large number of X-ray readings which are transmitted to the reconstruction computer which computes the CT image.

As best shown in FIG. 2, each of the end members 21, 22 of the housing 20 is a composite assembly having a plurality of slots 26 for receiving the unit cell assembly to be described below. The unitary cell structure is also described and claimed in Hoffman U.S. application Ser. No. 236,738, filed concurrently with this application and assigned to the same assignee. As described there, the slots 26 are aligned with the X-ray source so that, with the unit cells in place, a plurality of detector cells are created which measure incident radiation in small increments over the detector arc. For the sake of convenience and because of the proven reliability for accurately mounting tungsten plates in a CT detector, a precision, dimensionally stable, machined ceramic substrate used in a commercial embodiment of the aforementioned xenon detector (and described in the afor-mentioned Shelley patent) is preferably employed for the purpose of providing the opposed unitary cell mounting slots. To that end, arcuate machineable glass ceramic sections 30, 31, preferably of Macor (trademark designation of Corning Glass Works for machinable glass ceramic), have precision machined therein a plurality of slots 26 which establish the cell position and spacing for each of the cells in the detector array. For convenience, the Macor sections can be modularized in 6 or 7 inch lengths for assembly in end to end fashion. The sections are bonded to mounting substrates 32, 33, preferably of titanium or type 430 stainless steel which have a thermal coefficient of expansion closely matching that of Macor. Other compatible materials can be used if desired.

The so-bonded subassemblies are then located within the detector body comprising arcuate members 34, 35, preferably of aluminum, joined at a predetermined distance by end members 36, 37 (FIG. 1). The assembly is further rigidified by the affixation of rear cover 23. Because the aluminum members have a coefficient of thermal expansion substantially different from the Macor-stainless steel subassemblies, the composite end members 21, 22 are brought together by means adapted to allow relative movement between those elements. More particularly, cap screws 40, 41 acting through bellville washers 42, 43 into threaded holes 44, 45 in the stainless steel substrates tend to draw the substrates with bonded Macor plates to the aluminum channels. As best shown in FIG. 4, sufficient clearance is left between the shank of the cap screws 40, 41 and the aluminum bodies 34, 35 to allow for slight relative movement which might be caused by a change in temperature.

Associated with the precision mounting arrangement described thus far, there is preferably provided a unitary detector cell having on a single substrate all of the elements necessary for converting incident X-ray flux to a measurable electrical signal. That structural combination reduces cross talk at the ends and rear of the cell, and accurately locates the scintillator and running diodes with respect to each other. As will be described in greater detail below, the present invention further enhances the detector attributes by reducing X-ray absorption in the front window while at the same time providing a fool-proof means of cell restraint, an enhanced but "automatic" light seal at the front of the cell, and means which allow not only ease of assembly without attention to dimension tolerances, but also the ability to reposition or replace cells as necessary.

Before describing the details of that structure, attention is first directed to FIG. 3 which illustrates a unitary detector cell 50. The cell is formed on a base plate 51 of high density material such as tungsten to serve as collimators for the respective cells. Bonded to the face 52 of the plate 51 is a scintillator body 54 mounted with its long axis parallel to the forward edge of plate 51. X-radiation falling on the cell is absorbed by the scintillator body which produces light in proportion to the amount of X-radiation absorbed. The presently preferred scintillator material is cadmium tungstate which exhibits very low hysteresis, very low afterglow and high Z axis uniformity. However, other scintillator materials such as cesium iodide activated with thallium can also be used.

In order to maximize light collecting efficiency within the cell, the tungsten plate 51 is first polished and then surface coated on both faces 52, 53 with a highly reflective material. It is presently preferred to apply a thin layer of silver by evaporative or sputter coating techniques following which a protective coating of magnesium fluoride is applied. For the purpose of recapturing light which might otherwise escape from the rear of the cell, the plate has affixed thereto a reflective bar 55 positioned generally parallel to the scintillator and to the rear edge of the plate. Although the bar can be of metal, we prefer to use boro silicate glass because its coefficient of thermal expansion is very like that of tungsten, and to deposit on the face 56 a reflective aluminum surface.

To substantially eliminate cross talk at the cell ends, positioned within the reflective cell with scintillator 54 are photoresponsive means, shown herein as a pair of PIN photodiode assemblies 60, 61 precisely positioned with respect to the other elements and bonded to the plate 51 to convert the light generated by the scintillator 54 in response to receipt of X-ray flux into a measurable electrical signal. The diodes are spaced inwardly from the plate edges to render the unit cell compatible with the described slotted structure, but as will be described below, are still protected from incident X-radiation. Preferably the diodes are operated in the photovoltaic mode, and the current produced thereby is sensed as a measure of incident X-ray flux. The active diode sensing surface, indicated at 62, substantially covers the entire end of the associated reflective cell. The active diode element is bonded by means of conductive epoxy to a substrate 63 which is preferably a ceramic material having a coefficient of thermal expansion very near that of the associated tungsten plate 51. The ceramic substrate can be molded and/or machined to relatively tight tolerances to provide a flat mounting surface for accurately positioning the diode on its mounting plate. A pair of wire leads 64 connect the active diode element to a printed circuit conductor 65 having mounting pads 66 for attachment of wires to connect the unit cell to the remaining CT electronics.

In order to maximize signal level, the PIN photodiodes 60, 61 are utilized in pairs, with one at either end of the reflective chamber. Operating the diodes in the photovoltaic mode allows the signals to be summed by simply connecting the diodes in parallel using a wire conductor so that the sum of the currents produced by the two diodes is applied to the sensing electronics of the scanner. As best shown in FIG. 4, a common signal wire 67 joins the signal paths 65 of the diodes 60, 61 and connects them to a printed circuit board 69*a* at the input of the data acquisition system subassembly. A common return wire 68 connects to a conductive foil 69 of each diode which is in electrical contact with the diode substrate by way of the aforementioned conductive epoxy.

Turning briefly to FIG. 5, there are shown a plurality of unit cells 50 disposed in side by side relationship in a portion of the array of FIG. 1. It is seen that the flat collimator plates 50 closely fit in opposed slots 26 in the slotted composite end members 21, 22. The diodes 60, 61 are within the cell and are shielded from leakage of light between cells by virtue of the close fit of the plates 50 into the slots 26. The rear reflective bar 55 prevents substantial loss of illumination to the rear of the cell.

In practicing the invention, according to the preferred embodiment, means are provided for establishing a fixed reference position for each plate in the array, for resiliently loading groups of plates to the reference position, and at the same time for completing the light sealing of each cell by creating a light seal at the edge adjacent the front window. Preferably the front window, which is configured to seal out light but to maximize transmission of X-radiation therethrough, disposes a reflective surface toward the cell, enhancing light collection efficiency.

Referring more particularly to FIGS. 2 and 4, there are shown a pair of front stop members 70, 71 associated with the slotted portion of the end members 21, 22. The stop members are arcuate in shape and, in order to provide a thermal match with the slotted support, can be made from titanium or 430 stainless steel, as are the base plates 32, 33. Preferably, the members 70, 71 are bonded to the Macor elements 30, 31 for defining an arcuate plate reference position for each plate in the assembly.

For sealing the array from entry of external light while at the same time minimizing absorption of X-ray flux, the front window 24 is closed by means of a graphite window element 73. Preferably, the window is formed of a non-metallic base made up of three or more layers of graphite fibers, each layer woven into a cloth and bonded together with epoxy. The epoxy composition is optimized to provide a good thermal match to the tungsten and Macor elements in the cell. Preferably gasket strips 74, 75 are disposed between ribs 76, 77 of the aluminum end members and the graphite window. The ribs 76, 77 also provide convenient surfaces for mounting lead shields 78, 79 which define the window 24 and protect the PIN photodiodes 60, 61 from direct receipt of X-radiation.

In practicing the invention, affixed to the inner surface of the graphite window 73 is an elongated resilient strip 80 dimensioned to fit between the stop members 70, 71 and, in the non-compressed state, to project slightly into the cell beyond the plate reference position established by the stops. Accordingly, it will be appreciated that insertion of a plate into its associated slots, and forcing of the plate forward against the stops will cause a slight compression of the resilient strip 80 thereby effecting a light seal between adjacent cells. It is preferable to provide means on the inner surface 81 of the resilient material 80 to reflect light back into the cell, further enhancing light collecting efficiency. To accomplish that, a strip of reflective Mylar 82 is affixed to the surface 81 of the resilient material 80 with reflective surface facing into the cell.

In order to enhance the flexibility of the unit cell when used with the described mounting arrangement, acting in concert with the window elements described above are resilient means for forcing a plurality of unit cells to the plate reference positions to both accurately position each cell and produce the desired light seal. To that end, there are provided a pair of resilient locking members shown herein as rubber snubbers 90, 91, preferably neoprene rubber having a durometer of about 50. The rubber snubbers are preferably on the order of one or two inches long so that they are associated with a limited number of cells. Each element has a major leg 92 for engaging the Macor slotted elements 30, 31 and a minor leg 93 for simultaneously engaging a corner of the plate 50. A non-resilient member, such as plate 95, of the same length as the resilient mount 90 is secured to the rear inner surface of the aluminum housing by screws 96. The presence on the rubber snubber engages the major leg 92 with the Macor base and slightly deforms the minor leg 93 by contact with the edge of the plate, to positively force the plate to and hold it in the plate reference position, with its forward edge against the stops 70, 71, and to impinge the entire forward plate edge into the reflective Mylar, creating an effective light seal.

A significant advantage of the invention is the stable cell geometry which results from its practice. While microphonics associated with the xenon detector are not a problem in a solid state detector, relative movement within a cell can change its response and thus degrade the CT image. As noted above, the materials within the cell are carefully selected to provide a good thermal match so that a change of temperature is unlikely to cause relative movement. However, had the plates been bonded in the Macor slots, the possibility of relative movement with temperature change arises. In practicing the invention, the resilient mount and fixed arcuate stop not only firmly establish and hold the plates in their predetermined reference positions, but eliminate thermal stresses that might otherwise be caused by bonding the plates within the slots.

In operation, flux incident on the array of FIG. 5 (directed into the paper) strikes the scintillators 54. Absorption of the X-ray photons by the scintillator raises the atoms in the scintillator to higher energy states which subsequently decay to lower energy states with the emission of a characteristic wave length band of light. The light either directly falls on the sensitive surfaces 62 of the opposed diodes 60, 61 or is reflected thereto by the surface 52 of the associated detector, the surface 51 of the adjacent detector, the reflective surface 56 of the end member 55, the reflective surface 82 of the front window, or some combination thereof in order to cause the diodes to produce an electrical signal which is coupled to the acquisition electronics of the CT scanner to produce a reading for that particular cell.

As described in the aforementioned concurrently filed Hoffmann application, the fact that each unit cell is virtually complete in and of itself allows pre-screening of cells, after manufacture and before asembly, in a fixture which simply simulates the reflective wall to be provided by the adjacent cell. As a result, it is possible to grade cells accordingly to actual measured characteristics and group cells with similar characteristics for later installation in proximity. The ability to either prescreen cells for matching characteristics, or to exchange cells within an array depending on array performance is particularly important when it is appreciated that one desires to have each cell respond like its neighbors, but that some cells are more important than others to the reconstructed image. More particularly, the most important cell in the entire array is the one in the center since it senses the rays through the exact center of the object and is thus involved in the reconstruction of every pixel. The least important are those at the edges of the array which sense rays which pass through only the edge portions of the body. It has been found that optimizing approximately the center 50 cells with respect to linearity and performance, is most important and that the remaining cells outboard thereof, while of importance, need not be given the same attention as the middle 50. Thus, since the invention described and claimed herein now makes it possible to interchange cells with minimum effort, any out of tolerance cells not detected during prescreening, can easily be swapped out so that at least the center 50 can be matched to the greatest extent possible, to yield even more accurate reconstructions.

It is important to note that the mounting structure described and claimed in this application further enhances the benefits of the unit cells described in concurrently filed Hoffmann application, since the unit cell is virtually complete in and of itself, and since the mounting arrangement not only automatically achieves the high tolerance positioning required of such a cell, but also allows convenient and fool-proof removal and replacement. In the manufacturing operation (or in field replacement if necessary) there are no critical tolerances which need attention from the workman when inserting or interchanging cells. More particularly, the critical tolerances are achieved by a machine in a factory when the diode, scintillator and other elements are positioned on the plate and when the plate reference position and slot positions are established. When a plate is to be installed or repositioned, it need only be slid into its slot and the resilient mount used to force the plate in question and its neighbors into the reference position and, at the same time create a seal. If it is desired to change a cell in the field, the serviceman need only remove the plates 95 for the cell in question, lift out the resilient mounts 90 for the cell in question, unsolder the two wires from the DAS interconnect board **69*a*** for the cell in question, then slide the cell from its mount. A new cell is replaced by simply reversing the operation while the serviceman need give no attention to critical tolerances since they are automatically achieved when the cell is relocked in position.

We claim as our invention:

1. In a scintillation detector having a housing including a pair of arcuate opposed end members carrying slots for receiving collimator plates, a plurality of collimator plates for slidingly but snugly fitting into opposed slots to define a plurality of detector cells, and means associated with each plate for detecting radiation received by its cell and producing an electrical signal in response thereto, the improvement comprising, arcuate stop means intersecting the slots for defining a plate reference position for each cell, window means disposed proximate the arcuate stop for admitting X-radiation but excluding light from the detector cells, resilient sealing means associated with the window and disposed to protrude past the plate reference position into the cells when uncompressed, the resilient sealing means being disposed to engage the plurality of collimator plates at discrete locations to effect an optical seal between adjacent cells, and resilient lock means adapted to bear at discrete locations against each of a plurality of plates for individually urging each of the plurality of plates against the arcuate stop and into the resilient sealing means to lock and seal the associated detector cells.

2. The improvement as set forth in claim 1 wherein the window means comprises a pluralilty of layers of woven graphite fiber, and epoxy means bonding the layers together.

3. The improvement as set out in either of claims 1 or 2 wherein the collimator plates include means rendering their surfaces reflective, and means associated with the resilient sealing means for rendering reflective the surface thereof which faces the cell.

4. The improvement as set out in claim 3 wherein the means rendering the resilient sealing means reflective is a reflective Mylar strip affixed to said resilient sealing means.

5. The improvement as set out in any of claims 1 or 2 wherein the resilient lock means includes a plurality of rubber snubbers positionable in the housing to bear at discrete locations against the rear edge of each of a plurality of plates, and removable means compressing the respective snubbers to individually urge each of the plurality of associate plates to the reference position.

6. The improvement as set out in claim 5 wherein each rubber snubber has a first leg for engaging the housing and a second leg for bearing at discrete locations against the rear edge of each of the plurality of plates, the removable means for compressing comprising a removable plate which deforms at least the second leg of the snubber.

* * * * *